Aug. 9, 1938.  J. M. HALBING  2,125,915
BLOWPIPE NOZZLE
Filed Feb. 27, 1934
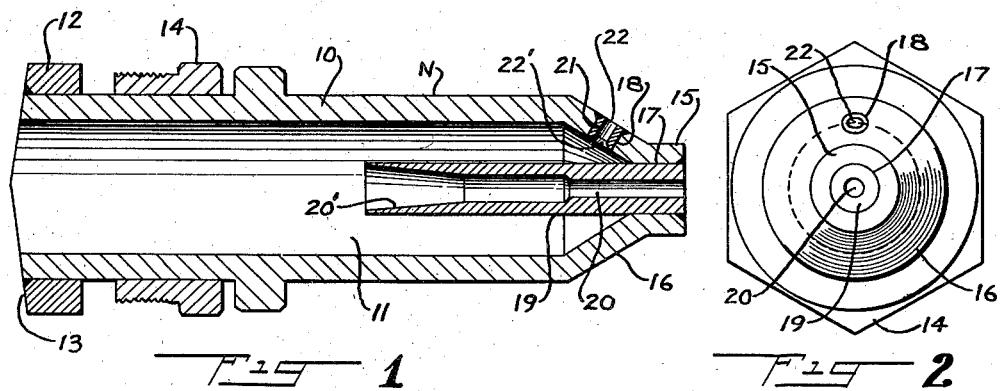
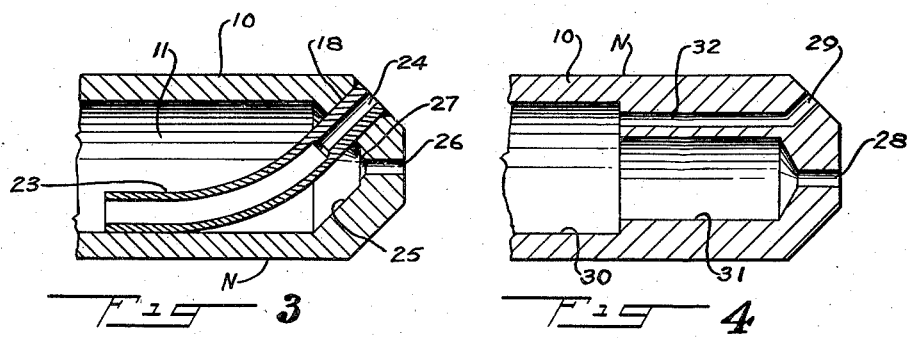
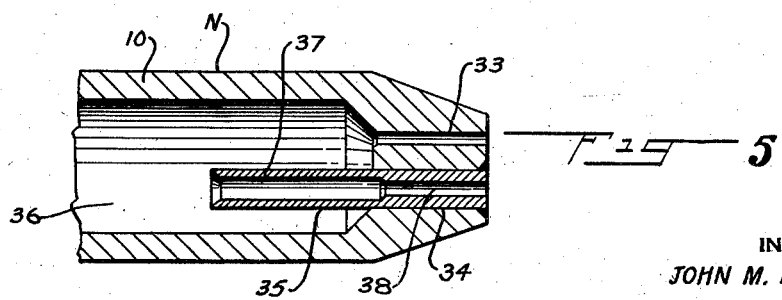
INVENTOR
JOHN M. HALBING
BY
ATTORNEY Patented Aug. 9, 1938

2,125,915

UNITED STATES PATENT OFFICE 2,125,915

BLOWPIPE NOZZLE

John M. Halbing, Bloomfield, N. J., assignor, by mesne assignments, to Union Carbide and Carbon Corporation, a corporation of New York Application February 27, 1934, Serial No. 713,243

14 Claims. (Cl. 158—27.4)

This invention relates to blowpipe nozzles, and more particularly to unitary multiple jet welding nozzles adapted to deliver separate gas jets, to provide a main welding flame and one or more auxiliary flames for preheating the work and/or a welding rod, or for other purposes.

Heretofore, unitary blowpipe nozzles having separate orifices for simultaneously delivering welding and preheating jets, have been subject to frequent backfiring, especially when the discharge passages which terminate in the orifices converge into the main gas supply passage of the nozzle. The inlets of these discharge passages are generally relatively close to one another; the passage which delivers the welding jet usually has its axis in line with or parallel to the axis of the main gas supply passage, and the axis of the passage which delivers the preheating jet may be inclined to the axis of the main supply passage; and in many instances the size of the outlet orifice for the welding jet is larger than the orifice for the preheating jet. The predetermined path of the gas flowing through the main passage has a tendency to "rob" gas from or supply insufficient gas to the inclined or preheating passage, probably because the velocity of the gas supplied to the inclined orifice possesses little if any velocity-head pressure, and the velocity of flow through the orifice depends solely upon the static pressure of the supplied gas. It is well known that backfiring will occur if the issuing velocity of the gas becomes less than the rate of flame propagation through the gas mixture.

The principal object of this invention is to provide an improved multiple flame blowpipe nozzle which is free from the objections just described, and in which the pressures of the gas streams flowing through the several orifices are balanced, so that each will deliver a satisfactory steady jet and so there will be substantially no backfiring.

The above and other objects and the novel features of this invention will become apparent from the following description taken with the accompanying drawing, in which:

Fig. 1 is a central longitudinal sectional view of a multiple flame blowpipe nozzle embodying this invention;

Fig. 2 is a front end view of the same; and

Figs. 3, 4, and 5 are central longitudinal sectional views illustrating other blowpipe nozzles embodying this invention.

Generally speaking, in the improved nozzle the welding and preheating gas orifices are located in the tip end of the nozzle as heretofore, but the discharge passage which terminates in one of these orifices communicates with the main gas supply passage at a substantial distance away from the inlet of the discharge passage which terminates in the other orifice; i. e., the inlet of one of these passages preferably is considerably nearer than the other to the inlet of said main passage. The close proximity of the entrances or inlets of the discharge passages is thus avoided; the pressures of the gas streams flowing through the several orifices are balanced; each orifice will constantly deliver the required steady jet; and backfiring is substantially eliminated.

Figs. 1 and 2 of the drawing illustrate a multiple flame blowpipe nozzle N embodying this invention which is especially adapted for welding operations where it is desired to preheat a welding rod or the work ahead of the welding region. As shown, the nozzle body 10 is preferably made of metal such as copper, and has a main gas supply passage 11 which receives a suitable combustible gas mixture, such as a mixture of oxygen and acetylene, from the blowpipe to which the nozzle is coupled. A collar 12 may be soldered to the rear end of the body 10 to provide an annular seating surface 13 adapted to make a gas-tight seal with a seat on the blowpipe head when the nozzle is coupled thereto by suitable means, such as the nut 14. The tip end of the body 10 may be formed to provide a section 15 of reduced diameter and a frusto-conical section 16 directly back of the section 15. The welding jet orifice may be provided by drilling a hole 17 of appropriate diameter through the section 15 parallel to or axially in line with the axis of the passage 11; and a preheating jet orifice may be provided by drilling a hole 18 (or holes) perpendicularly through the conical section 16, so that the axis of the discharge passage terminating in the orifice will be inclined to the axis of the passage 11. In order to remove the entrance or inlet of the discharge passage terminating in one of these orifices a substantial distance from the inlet to the other discharge passage and thereby equalize or balance the pressures of the gas flowing through the several orifices, a copper tube 19 fits tightly in and is soldered at its front end into the hole 17 and is of such length that it extends a substantial distance back into, and preferably axially of, the main supply passage 11. The inlet of the passage 20 through the tube 19 may be tapered, as at 20', and said passage may be otherwise shaped and constricted to insure the delivery of a satisfactory welding jet. A short copper tube 21 may be soldered tightly in the hole 18 to provide an outlet orifice 22 having a tapering entrance 22', to deliver a satisfactory preheating jet at an angle to the welding jet.

In the embodiment of this invention shown in Fig. 3, a long copper tube 23, bent so as to rest against the wall of the main gas supply passage 11, may be soldered in the hole 18 to locate the inlet of the discharge passage terminating in the preheating gas orifice at a substantial distance back of the inlet of the discharge passage terminating in the welding gas outlet orifice. Adjacent its outlet end, the tube 23 may be provided with a constriction 24 to deliver the desired preheating jet. In this embodiment of the invention, the front end of the main passage 11 may be tapered, as at 25; and the entrance to the discharge passage terminating in the welding gas outlet orifice 26 may be tapered as at 27,—all to assist in delivering a satisfactory welding jet. The outlet orifices for the welding jet and the preheating jet are thus both at the tip end of the nozzle and the discharge passages which terminate in these orifices are inclined to one another, but neither will rob gas from or otherwise disturb the jet delivered by the other.

A further embodiment of the invention is shown in Fig. 4, in which the entrances to the outlet orifices 28 and 29 for the welding jet and the preheating jet, respectively, are also widely separated. Here, the bore 30 and a counterbore 31 constitute the main gas supply passage leading to the inlet of the discharge passage which terminates in the welding jet orifice 28. The provision of the counterbore 31, of slightly smaller diameter than the main bore 30 and offset from the axis of the latter, leaves sufficient metal inside the nozzle for a drilling 32 which serves as a gas passage connecting the main gas passage 30 and the preheating jet orifice 29. The gas flow to the welding jet orifice thus has no unbalancing effect on the flow of gas to the preheating jet orifice.

The principles of the invention are also applicable to advantage in a multiple flame nozzle in which the outlet orifices are parallel, especially when such orifices differ in diameter, as shown in Fig. 5, and there is a tendency for the larger orifice to rob gas from the smaller one and thereby reduce the velocity of gas issuing from the latter to a value below the rate of flame propagation of the gas mixture. Here, the preheating gas discharge passage 33 is parallel to the hole 34 into which is soldered the copper tube 35 that provides the welding gas outlet orifice. The tube 35 projects a substantial distance back into the main gas supply passage 36, to separate the inlets of the discharge passages which terminate in the orifices sufficiently to insure steady welding and preheating jets and to minimize backfire. The passage 37 through the tube 35 may be constricted, as at 38, or otherwise formed to provide the desired welding jet.

It will be evident that in each instance the conduit means, which separates the inlet of one discharge passage from the other, extends back into the main supply passage a sufficient distance to insure that the pressures of the gas streams flowing through the orifices will be balanced; and where the axes of the discharge passages converge inside the main passage, the tube or conduit means extends back of the point of convergence. The tubes 19, 23, and 35 may be readily inserted from the tip end of the nozzle and are firmly connected to the nozzle body by a circumferential gas-tight silver solder joint between the ends of these tubes and the edges of the holes into which they fit. These tubes provide the additional advantage that the passages therethrough may be drilled to the desired shape and size more easily and accurately than it is possible to drill such passages directly in the nozzle tip. Furthermore in all embodiments of the invention the inlets of the discharge passage or passages and the entrance of the conduit means are directed upstream, that is to say in the direction from which the gas passes along the main passage of the nozzle.

It will be understood that the invention may be applied to other types of blowpipe nozzles, such as those having more than one welding orifice or more than one preheating orifice, and various other changes may be made in the details of construction without departing from the principles of the invention.

I claim:

1. A multiple jet blowpipe nozzle comprising a body having a main gas supply passage; a tip at the end of said body having a welding jet orifice and a preheating jet orifice both in communication with the main gas supply passage in said body, and a tube soldered to said tip at one of the orifices, said tube extending into the passage in said body back of the other orifice and providing an inlet to said orifice, the axis of which is substantially parallel with the axis of the main passage.

2. A multiple jet blowpipe nozzle having separate outlet orifices and a main passage for supplying gas to the orifices; said nozzle comprising means within the main passage adapted to form an entrance for one of said orifices spaced from the other, and in position to intercept a portion of the gas passing through said main passage prior to its reaching said other orifice.

3. A multiple jet blowpipe nozzle having a main axial passage therein, said nozzle also having therein two outlet orifices extending directly from the main axial passage to atmosphere, the inlet of one orifice being a considerable distance behind that of the other and being substantially parallel with the axis of said main passage.

4. A multiple jet blowpipe nozzle having a main gas supply passage, a welding jet orifice, and a preheating jet orifice; both orifices communicating with the main passage; and conduit means comprising a tube secured to the tip of said nozzle extending within said nozzle, and providing an inlet for one orifice at a substantial distance from the inlet of the other orifice, the axis of said inlet being substantially parallel with the axis of said main passage.

5. A multiple jet blowpipe nozzle having a main gas supply passage, a welding jet orifice, a preheating jet orifice both orifices communicating with the main passage; the axes of the orifices converging within the main gas supply passage; and conduit means within said nozzle providing an inlet for one orifice at a substantial distance from the inlet of the other orifice; said conduit means extending into the main gas supply passage back of the point of convergence of the orifice axes.

6. A blowpipe nozzle comprising a body having a tip, said tip having two discharge passages and said body having a main passage adapted to supply gas to both of said discharge passages, and conduit means extending rearwardly from the one of said discharge passages and communicating with said main passage at a substantial distance behind the other discharge passage in such manner that the inlet to said first discharge passage will be substantially parallel with the flow of gas through said main passage.

7. A blow pipe nozzle as claimed in claim 6, in which both the entrance of said conduit means and the inlet of said other discharge passage are directed upstream.

8. A blowpipe nozzle comprising a main passage adapted to conduct a gas; a nozzle head provided with multiple gas jet orifices; and means for preventing the gas issuing from one of said orifices from affecting the velocity of gas issuing from the other, comprising a device associated with one of said orifices and adapted to direct a portion of said gas toward said orifice from a point substantially up stream from said other orifice to thereby equally distribute the velocity-head pressure of the gas within the main passage between all of the orifices.

9. A blowpipe nozzle comprising a main passage adapted to conduct a gas; a nozzle head provided with multiple gas jet orifices, the axis of at least one of said orifices being substantially aligned with, and the axis of at least another of said orifices being angularly related to, the axis of said main passage; and means associated with one of said orfices for substantially balancing the exit pressure of the gas issuing from both of said orifices comprising a device adapted to direct a portion of said gas toward said orifice from a point substantially up stream from said other orifice to thereby equally distribute the velocity-head pressure of the gas within said main passage between said orifices.

10. A blowpipe nozzle comprising a main passage adapted to conduct a gas; a nozzle head provided with multiple gas jet orifices, the axes of at least two of said orifices being respectively substantially aligned with, and angularly related to the axis of said main passage; and means associated with the angularly related orifice for substantially balancing the exit pressure of the gas issuing therefrom relative to that of the aligned orifice comprising a conduit leading from said angularly related orifice, extending back into said main passage, and having an inlet constructed and arranged to direct a portion of the gas flowing through said main passage towards said angularly related orifice without initially changing its direction of flow.

11. A multiple jet blowpipe nozzle having a main passage adapted to supply gas to separate closely spaced outlet orifices in communication with said main passage; said nozzle comprising conduit means extending from one of the orifices back into the main passage a substantial distance behind the point at which the other orifice communicates with the main passage and having its inlet substantially parallel with said main passage.

12. A multiple jet blowpipe nozzle having a main gas supply passage and separate outlet orifices converging toward and opening into the main passage; means associated with one of said orifices, extending a substantial distance from the other orifice, and comprising an inlet directed into said main passage and substantially parallel with the axis thereof.

13. A multiple jet blowpipe nozzle having a main gas supply passage, and a plurality of outlet orifices communicating with the main passage, said nozzle comprising a tube extending from one outlet orifice into the main passage of said nozzle and adapted to provide an inlet for said outlet orifice at a point substantially up stream from the other orifice and within said main passage.

14. A multiple jet blowpipe nozzle according to claim 13, in which the passage through said tube has a constriction.

JOHN M. HALBING.